United States Patent [19]

Thiesen

[11] Patent Number: 5,147,137
[45] Date of Patent: Sep. 15, 1992

[54] REFRACTORY THERMOWELL FOR CONTINUOUS HIGH TEMPERATURE MEASUREMENT OF MOLTEN METAL

[75] Inventor: Todd J. Thiesen, Idaho Falls, Id.

[73] Assignee: The United States of America as represented by the United States Department of Energy, Washington, D.C.

[21] Appl. No.: 643,320

[22] Filed: Jan. 22, 1991

[51] Int. Cl.$^5$ .............................................. G01K 1/12
[52] U.S. Cl. .................................... 374/139; 136/234; 266/87; 374/208; 374/179
[58] Field of Search ........................ 136/230, 232, 234; 266/87, 88, 280; 374/125, 121, 139, 141, 179, 208; 431/121

[56] References Cited

U.S. PATENT DOCUMENTS

| | | | |
|---|---|---|---|
| Re. 32,192 | 6/1986 | Vayssiere et al. | 266/220 |
| 1,233,385 | 7/1917 | Maurer | 374/208 |
| 3,115,781 | 12/1963 | Shearman | 374/139 |
| 3,610,045 | 10/1971 | Shearman | 136/234 |
| 3,652,068 | 3/1972 | Truppe et al. | 136/234 X |
| 3,862,574 | 1/1975 | Antoine et al. | 374/208 X |
| 4,075,035 | 2/1978 | Trevedy | 136/210 |
| 4,358,953 | 11/1982 | Horiuchi et al. | 374/7 |
| 4,365,788 | 12/1982 | Block | 266/87 X |
| 4,377,347 | 3/1983 | Hanmyo et al. | 374/139 |
| 4,433,832 | 2/1984 | Butts | 266/88 X |
| 4,454,370 | 6/1984 | Voznick | 374/208 X |
| 4,708,482 | 11/1987 | Neiheisel | 356/376 |
| 4,724,428 | 2/1988 | Brown, Jr. | 374/139 X |
| 4,776,705 | 10/1988 | Najjar et al. | 374/139 |
| 4,786,188 | 11/1988 | Myhre et al. | 374/125 |
| 5,005,986 | 4/1991 | Najjar et al. | 374/139 X |
| 5,064,295 | 11/1991 | Thill et al. | 374/139 |

FOREIGN PATENT DOCUMENTS

| | | | |
|---|---|---|---|
| 57-94625 | 6/1982 | Japan | 374/139 |
| 800690 | 1/1981 | U.S.S.R. | 374/139 |
| 2115550 | 9/1983 | United Kingdom | 374/208 |

*Primary Examiner*—Allan N. Shoap
*Assistant Examiner*—G. Bradley Bennett
*Attorney, Agent, or Firm*—Mark P. Dvorscak; Robert J. Fisher; William R. Moser

[57] ABSTRACT

An apparatus for the continuous high temperature measurement of materials in vessels lined with rammed or cast refractory materials. A refractory housing member is integral with the refractory lining of the vessel and contains a plurality of high temperature sensing means, such as thermocouples. A face of the housing is flush with the refractory lining and contacts the high temperature material contained in the vessel. Continuous temperature measurement is achieved by a means which is coupled to the thermocouples for indicating the temperature.

8 Claims, 2 Drawing Sheets

REFRACTORY THERMOWELL FOR CONTINUOUS HIGH TEMPERATURE MEASUREMENT OF MOLTEN METAL

CONTRACTUAL ORIGIN OF THE INVENTION

The U.S. Government has rights in this invention pursuant to Contract No. DE-AC07-76ID01570 between the U.S. Department of Energy and EG&G Idaho, Inc.

BACKGROUND OF THE INVENTION

The present invention relates generally to high temperature measurement of materials or processes in vessels, and more particularly to an apparatus which continuously measures the temperature of material contained in a refractory vessel.

Vessels handling molten metals, such as BOF steel furnaces, are usually provided with a refractory lining to prevent the molten metal contents of the vessel from coming in contact with the outer supporting structure of the vessel. This lining can be made from bricks, poured as a casting, or from plastic refractory materials. Bricks are typically cut to fit the vessel and mortared into place. Forming the lining from castable materials is performed by lining the vessel with a form, and pouring the castable into the form. Plastic refractories are like thick castable materials, and have the consistency of modeling clay. They are installed by ramming or pounding the material in place, and then setting into a monolithic lining by firing. Over a period of time, the refractory lining of the refractory erodes, and portions become damaged, reducing the thickness. This erosion is due in large part to overheating of the molten metal contained in the vessel.

Temperature measurement of molten metal in such vessels is typically accomplished by using an infra-red temperature device, or by temporarily inserting a standard thermocouple into the molten bath. Infra-red devices only measure the surface temperature of the molten metal, and when the surface starts to cool and form a crust, this method is no longer suitable. At this point, temperature is measured by breaking the surface crust and inserting a temperature probe or thermocouple, into the metal bath.

Due to the hostile environment encountered in industrial applications, the thermocouple is usually placed within a protecting tube, or thermowell. Typically, rod-shaped thermowells of various lengths containing thermocouples are employed to measure the temperature of the metal bath. The thermowell can be manufactured from various materials depending on the intended temperature range expected to be measured. For measurement of lower temperatures (up to about 1400° F.), thermowells of stainless steel can be used. As the temperature goes up (to about 4000° F.), refractory coated thermowells, or solid refractory thermowells, must be used. These are typically rod-shaped, and six inches to two feet in length. Such thermowells are not suited for continuous service, and are essentially disposable. At high temperatures the refractory, or the steel under the refractory, loses its strength and breaks or erodes.

Rod-shape probes are inserted into the vessel through a hole drilled through the refractory lining. The hole in the refractory lining communicates with an opening in the vessel wall which permits passage of the thermocouple wire pair for connection with an appropriate temperature display. Thus, a problem associated with rod-shaped probes is that they provide a discontinuity through the entire thickness of the lining and the vessel. This produces a point of wear and potential point for failure of the lining.

Another type of thermowell consists of a bare thermocouple junction covered by a thin glass tube. These have a fast response time in that temperature is displayed rapidly, but are very short lived, burning out after only one or two measurements. Accordingly, it is an object of this invention to provide an apparatus capable of continuous, high temperature measurement of the molten materials contained in refractory lined vessels.

Another object of the invention is to provide a more accurate indication of temperature in a refractory lined vessel containing molten metal such that overheating of the molten metal is prevented.

Yet another object of the present invention is to minimize erosion of the refractory lining of a vessel containing molten metal by providing accurate temperature measurements to prevent overheating.

A further object of this invention is to provide a thermowell integral with the refractory lining of a vessel to eliminate discontinuities in the refractory lining caused by the use of rod-shaped thermowells.

SUMMARY OF THE INVENTION

To achieve the foregoing and other objects, and in accordance with the purposes of the present invention, as embodied and broadly described herein, the thermowell comprises a housing member implanted in the refractory lining of a vessel containing a high-temperature material such as molten metal. The housing has a face which contacts the molten metal, and is capable of receiving a high temperature sensing means. A plurality of high-temperature sensing means are inserted into the thermowell, and the temperature sensing means are coupled with a means for continuously transmitting a signal representing the temperature of the material in the vessel.

In another aspect of the invention, a vessel containing a material whose temperature is to be measure is provided. The vessel includes a refractory lining having an interior wall. Integral with the refractory lining of a vessel is a thermowell block which has a face flush with the interior wall of the lining. Thermocouples are embedded in the thermowell block to provide for continuous temperature measurement of the material in the vessel. The thermowell block also has a front and a rear face, the front face lying adjacent to the vessel lining. It is preferable that the thermowell is a disc having tapered sides. Thermocouples are contained in the thermowell, and contain leads which exit through apertures in the rear face of the members. These leads are coupled to a means for continuously indicating the temperature of the material in the vessel. In other aspects, a plurality of thermowells can be implanted in the refractory lining of the vessel.

BRIEF DESCRIPTION OF THE DRAWINGS

The above-mentioned and other features of the invention will become more apparent and best understood, together with the description, by reference to the accompanying drawings, in which.

DETAILED DESCRIPTION OF THE INVENTION

Figure 1:
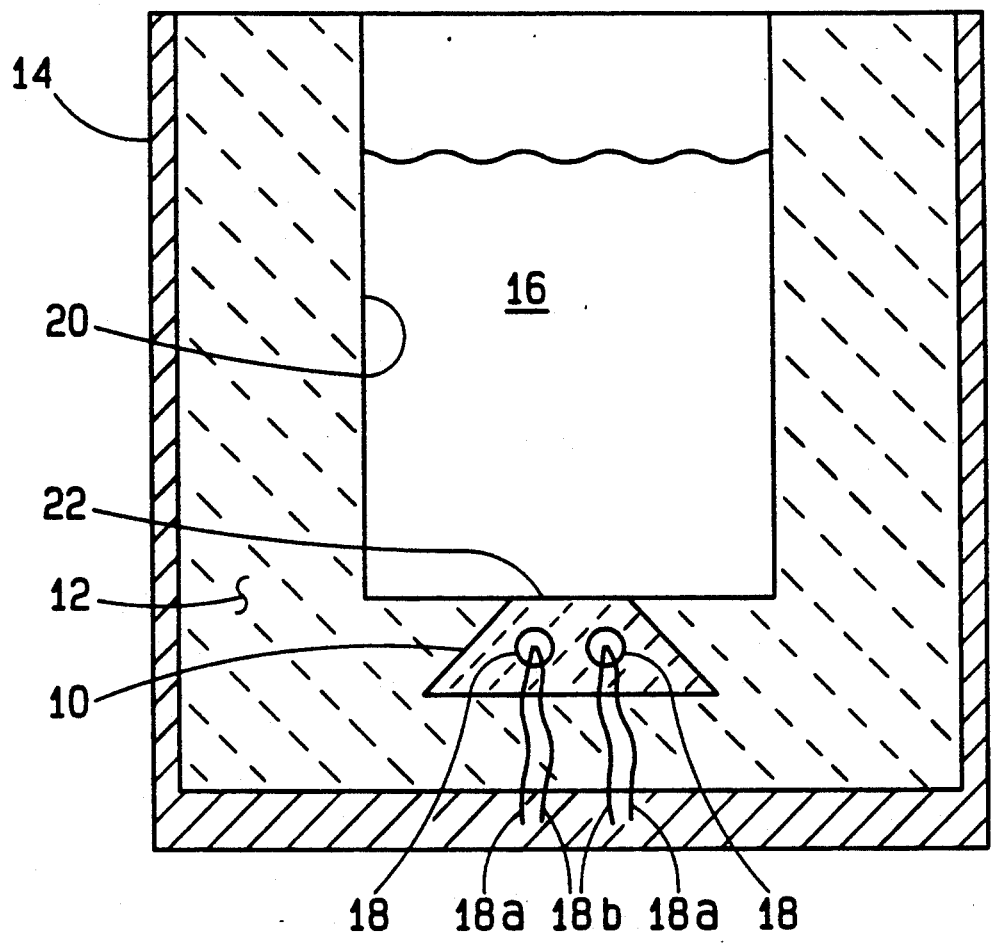
FIG. 1 shows a cross sectional view of a vessel containing molten metal with a thermowell integral with the vessel's refractory lining.

A refractory thermowell 10 in accordance with the present invention is shown in FIG. 1. The thermowell 10 is integral with the lining 12 of a vessel 14 containing a high-temperature material, such as molten steel 16. The thermowell 10 is implanted in the refractory lining 12, and is capable of receiving two or more high-temperature sensing means 18. The high temperature sensing means 18, preferably thermocouples, are inserted into the thermowell. The thermocouples 18 have wire pair leads 18a and 18b which exit from penetrations in the rear face of the thermowell and through holes in the refractory lining and are coupled to a means (not shown) for continuously indicating the temperature of the molten metal. Although one thermowell is shown and described, it is understood that a plurality of thermowells could be implanted into the refractory lining without departing from the scope of the present invention. Additionally, the location of a single thermowell could be anywhere along the refractory lining, and not only at the bottom center as shown in FIG. 1.

Figure 2:
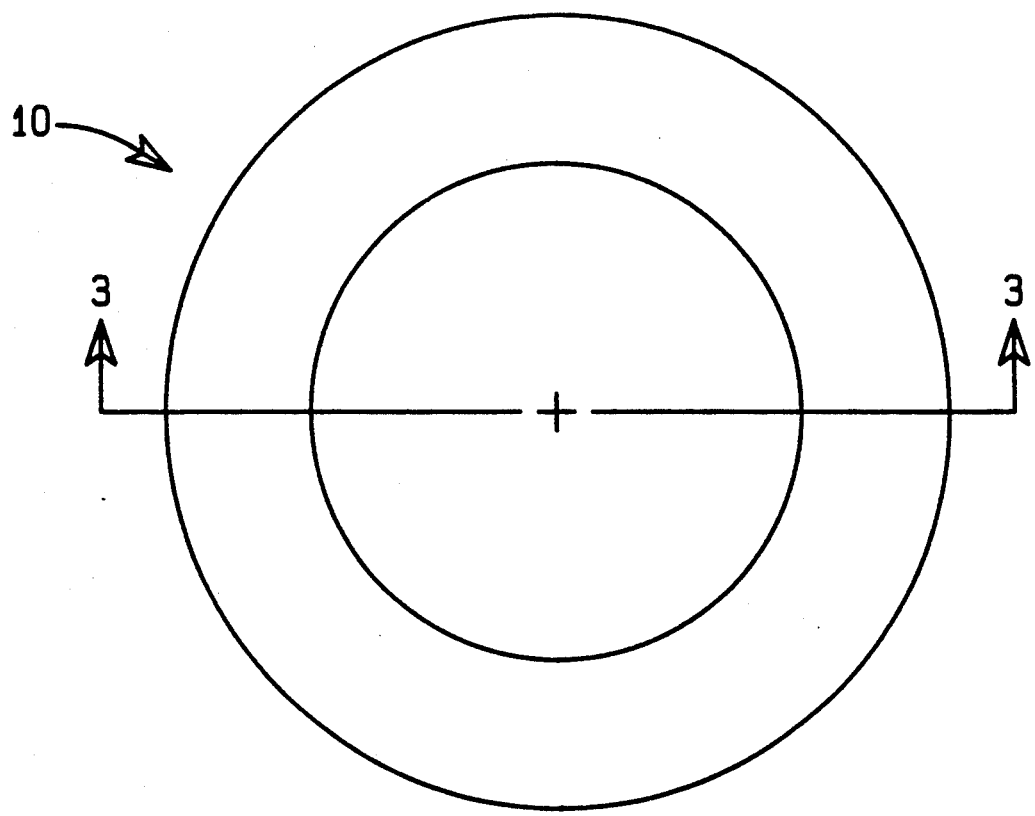
FIG. 2 shows a top view of a thermowell.
Figure 3:
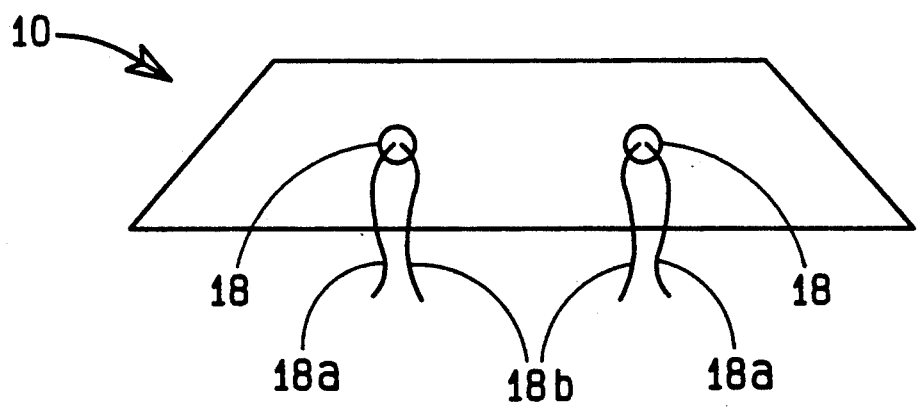
FIG. 3 shows a sectional view of a thermowell taken at the line 3—3 of FIG. 2.

A detailed view of the thermowell 10 is shown in FIGS. 2 and 3. As illustrated, the thermowell is a disc, preferably in the shape of a truncated cone, or the shape of a cone cut perpendicular to its axis. Other thermowell shapes are possible. For example, a rectangular body having tapered walls, such as a multi-sided, truncated pyramid, would be possible. The size and thickness of the resulting thermowell can be varied to suit the thickness of the lining 12 into which it will be implanted. A typical disc shaped thermowell as contemplated by this invention would be a disc with tapered walls having a 4 inch diameter and about 2 inches thick.

The thermowell 10 is advantageous over other types of thermowells. Rod shaped thermowells provide a discontinuity through the entire thickness of the lining, which produces a point of wear and potential point for failure of the lining. In contrast, with the thermowell of this invention, the only penetrations through the lining would be for the thin thermocouple wires, which do not provide a large enough path for failure by penetration of the metal. Another advantage provided by the present invention is that a thermowell having tapered sides permits implantation of the thermowell into the lining, with the lining providing a backup material. The tapered sides of the thermowell positions, or "keys", the disc into the lining to prevent it from floating or working loose. Thus, the thermowell is provided with added support and stability.

The thermowell 10 must be made from refractory materials which match the service application and thermowell type. Preferably, the thermowell is made from the same refractory material as the vessel lining. High purity alumina (greater than 99% $Al_2O_3$) is suitable for most high temperature applications. Other materials which may be suitable include silicon carbide, chrome alumina, chrome magnasite, or any other refractory material.

As shown in FIG. 1, the lining 12 of the refractory vessel 14 has an interior wall 20. The thermowell 10 has a face 22 which when implanted in the lining, is contiguous with, or adjacent to, the interior wall 20 to facilitate temperature measurement of the material in the vessel.

It is contemplated that the thermowell is manufactured by press forming. A die in the shape of the thermowell to be made is filled with a refractory material such as $Al_2O_3$. The die is pressed, and small holes are drilled for insertion of the thermocouples. After the thermocouples are inserted into the holes, the die is pressed again, and the holes are filled with $Al_2O_3$.

The thermowell 10 is integral with the refractory lining. Integration of the thermowell with the lining can be accomplished by various techniques. It is contemplated that the manufactured thermowell will be installed at the same time as the lining of the vessel, and this installation will be dependent on how the lining of the vessel is installed. For example, if the vessel lining is compacted, the thermowell will similarly be compacted into place. If the vessel lining is made from refractory bricks, the thermowell will also be a brick which is mortared into place. A vessel lining cast into place would be cast around a thermowell already positioned at a desired location.

The thermocouples are inserted into the thermowell to provide a means for indicating the temperature of the molten metal in the vessel. The thermocouple wire pair leads 18a and 18b can be a variety of material selected to match the desired temperature range. Commercially available noble metal thermocouple wire pairs, such as platinum-rhodium thermocouples, having a range of 32°–3000° F., can be used for most high temperature applications.

The thermocouples wire pairs 18a and 18b exit from a rear face of the thermowell and through a small penetration in the lining of the vessel, and are coupled to an appropriate temperature display for continuously transmitting and displaying the temperature of the material in the vessel.

The arrangement of the thermocouples within the thermowell can vary depending on the particular type of temperature measurement desired. The thermocouples can all be placed at the same distance from the front face, or at staggered distances. Planting of the thermocouples at staggered distances or at various depths within the thermowell would compensate for the expected slow erosion of the thermowell due to the normal erosion experienced by a refractory lining over a period of use. Thus, even though the thermowell will gradually erode, continuous temperature measurement is still obtainable since the staggered arrangement of thermocouples within the thermowell provides uneroded points. Additionally, since more accurate temperature measurement is achievable with this invention, it is expected that erosion of the thermowell and refractory lining will diminish since overheating of the molten metal will not occur.

There has thus been shown and described a refractory thermowell which is integral with the refractory lining of a vessel contain molten metal. The thermowell of this invention provides continuous high temperature measurement. The continuous high temperature measurement obtained through this invention results in more accurate temperature evaluations, and thus can provide a means to avoid overheating of the molten metal. Additionally, the integrated thermowell reduces points of potential wear and failure of the refractory lining since penetrations through the lining are minimal.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described to best explain the principles of the invention and its practical application and thereby enable others skilled in the art to best utilize the invention in various embodiments and with various modifications as are suited to the particular use contemplated. It is intended that the scope of the invention be defined by the claims appended hereto.

The embodiments of the invention in which exclusive property rights or privileges are claimed are defined as follows:

1. In a vessel for handling molten metal having an interior refractory lining, apparatus for continuous high temperature measurement of the molten metal comprising:
   a) a thermowell constituting an element of the interior lining, being constructed from the same refractory material as that of the interior lining, the thermowell further having a front face and a rear face, the front face lying adjacent to the lining of the vessel but not projecting into the vessel, and the rear face being backed by the refractory lining;
   b) the thermowell containing a multiplicity of thermocouples, the thermocouples having leads which exit through apertures in the rear face of the thermowell and through small penetrations in the refractory lining,
   c) the leads being coupled to a means for continuously indicating the temperature of the molten metal in the vessel.

2. The apparatus of claim 1 wherein the thermowell is a disc in the shape of a truncated cone, and has tapered sides keyed into the refractory lining.

3. The apparatus of claim 2 wherein the thermocouples in the thermowell are each placed at the same distance relative to the front face of the thermowell.

4. The apparatus of claim 2 wherein the thermocouples in the thermowell are placed at staggered distances relative to the front face of the thermowell.

5. The apparatus of claim 1 wherein the thermowell is made from $Al_2O_3$.

6. In a vessel for handling high-temperature material, the vessel having an interior lining of refractory material, means for continuous high temperature measurement of the high-temperature material comprising:
   a) at least one thermowell integral with and forming a part of the refractory lining, said thermowell being of the same refractory material as the lining of the vessel and having a front face on a plane common with that of the interior lining and contacting the high-temperature material; and a rear face being supported by the refractory lining;
   b) at least one thermocouple inserted in each thermowell;
   c) means coupled to each thermocouple for continuously transmitting an electric signal representative of the temperature of the material in the vessel.

7. The means for continuous high temperature measurement of claim 6 wherein the refractory material is $Al_2O_3$.

8. The means for continuous high temperature measurement of claim 7 wherein the thermowell is a disc in the shape of a truncated cone, having tapered sides keyed into the lining.

* * * * *